July 17, 1956 E. V. ELCONIN 2,755,097
TORQUE ROD MOUNTING FOR VEHICLE SUSPENSION
Filed Feb. 10, 1953 2 Sheets-Sheet 1
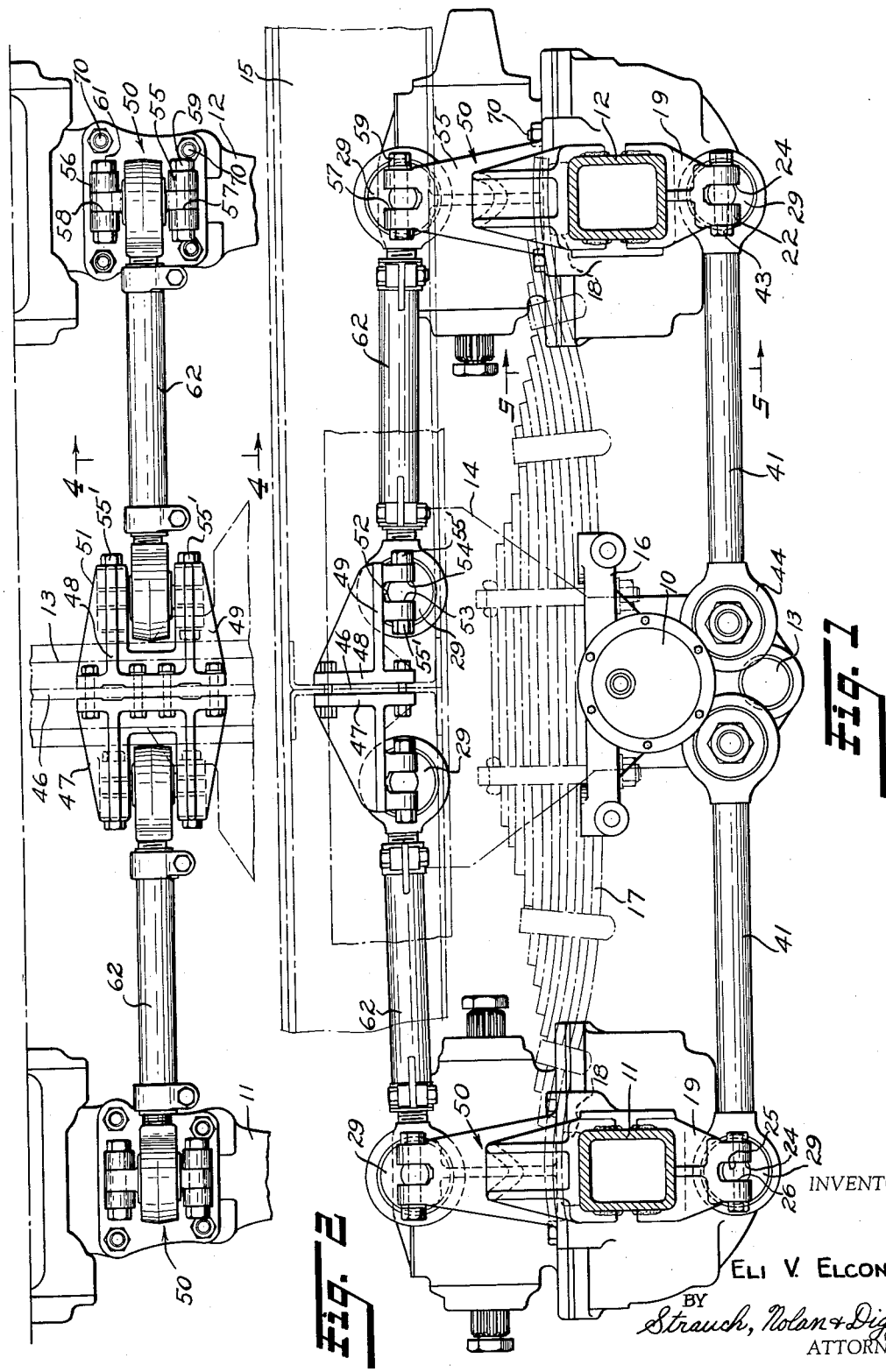
INVENTOR
Eli V. Elconin
BY Strauch, Nolan & Diggins
ATTORNEYS

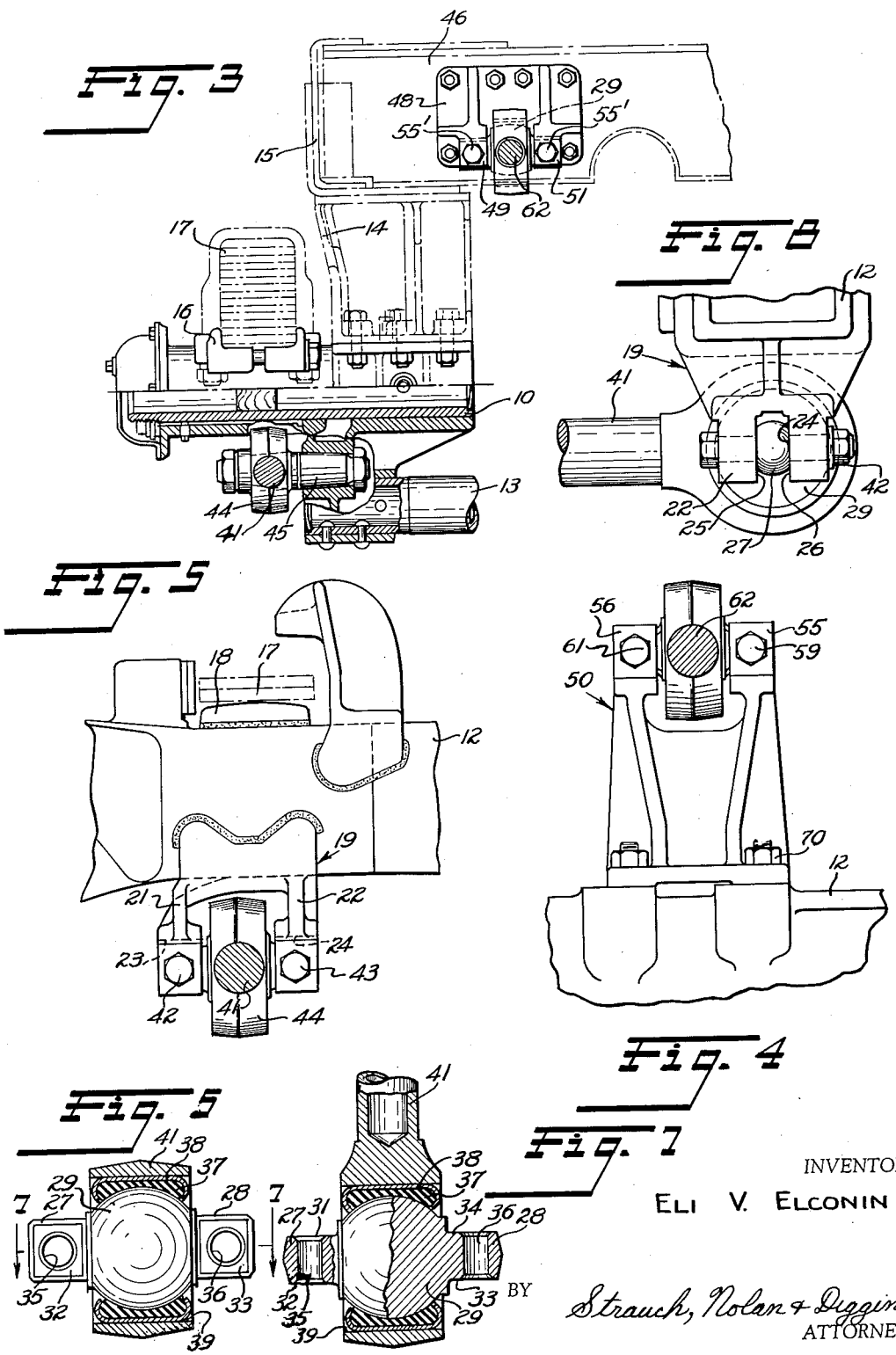

United States Patent Office 2,755,097
Patented July 17, 1956

2,755,097

TORQUE ROD MOUNTING FOR VEHICLE SUSPENSION

Eli V. Elconin, Detroit, Mich., assignor, by mesne assignments, to Rockwell Spring and Axle Company, Coraopolis, Pa., a corporation of Pennsylvania Application February 10, 1953, Serial No. 336,146

8 Claims. (Cl. 280—104.5)

This invention relates to vehicle suspensions and particularly to torque rod mountings especially useful in tandem axle suspensions.

The invention contemplates readily assembled and detachable torque rod end connections for a tandem axle assembly, a feature of particular merit in servicing and repairing heavy duty vehicles, and it is an important part of the invention that most of these end connections are interchangeable for simplifying assembly and reducing inventory.

It is therefore an object of the present invention to provide a novel tandem axle assembly wherein a plurality of torque rods are connected between the axles and the frame and special torque rod end connections are incorporated to provide an extremely useful efficient assembly.

A further object of the present invention is to provide a novel torque rod end universal joint connection wherein the ball of the joint has rigid side arms that fit into an open-ended mounting bracket recess.

Further objects of the invention will appear in connection with the appended claims and the annexed drawings wherein:

Figure 1 is a side elevation of a tandem axle suspension incorporating a preferred embodiment of the invention;

Figure 2 is a top plan view of one side of the suspension of Figure 1;

Figure 3 is an end elevation partly in section illustrating the relative location of the torque rods;

Figure 4 is a section on line 4—4 of Figure 2 illustrating a torque rod end support;

Figure 5 is a section on line 5—5 of Figure 1 illustrating another torque rod end support;

Figures 6 and 7 are sectional views through the ball and socket end of a torque rod end of the invention; and Figure 8 is an enlarged fragmentary side elevation of such a torque rod end connection.

The tandem axle assembly shown for purposes of illustration of the invention comprises spaced parallel drive axle housings 11 and 12 which are connected to drive shafts in a conventional manner. Midway between axle housings 11 and 12 is a rigid cross tube 13 that extends parallel to the axle housings between heavy depending brackets 14 that are attached to the opposite side rails 15 of the vehicle chassis.

Aligned trunnions 10 on the brackets 14 serve to journal spring seats 16 that are attached to parallel leaf spring assemblies 17, one on each side of vehicle, outwardly of the brackets 14 as shown in Figure 3. Preferably the trunnion axis is about an inch below the plane of the axle axes under normal load. At their opposite ends the springs enter and rest freely upon saddle pads 18 illustrated in Figure 5 as constructed on the axle housing ends.

Beneath each saddle 18 a bracket 19 is welded to the axle housing and comprises two integral spaced parallel arms 21 and 22 which, as illustrated best in Figure 8, are formed with downwardly open elongated recesses 23 and 24 respectively. Recesses 23 and 24 each have flat parallel sides 25 and 26 (Figure 8) for slidably receiving flat sided arms 27 and 28 (Figures 6 and 7) which project diametrically oppositely from a spherical metal ball 29. Arm 27 has parallel flat sides 31 and 32, and arm 28 has parallel flat sides 33 and 34. Arms 27 and 28 are formed with parallel identical bores 35 and 36 respectively that are perpendicular to the flat sides of the arms and are equally spaced from the center of the ball.

Ball 29 is surrounded by a sleeve 37 of rubber or like resilient material held in compression about the ball by a thin metal shell 38 which is press fitted within a cylindrical bore 39 on the end of torque rod 41, the axis of bore 39 being normally parallel to the flat sides of arms 27 and 28.

Referring now to Figures 1 and 5, through bolt assemblies 42 and 43 are provided in arms 21 and 22 respectively passing through bores 35 and 36 for securing the ball rigidly to bracket 19. In assembly, the torque rod end sub-assembly includes ball 29 universally mounted in bore 39, and the arms 27 and 28 are merely slidably fitted into the open ends of the recesses 23 and 24 until the bores 35 and 36 align with corresponding holes in the bifurcated arms, whereupon bolt assemblies 42 and 43 are inserted and drawn tight to clamp the ball 29 against rotation.

At their trunnion ends, torque rods 41 are each formed with an enlarged end portion 44 having a cylindrical bore surrounding a spherical ball integral with a stud 45 which is rigidly secured to the lower end of bracket 14 as illustrated in Figure 3. The cylindrical bore and resilient sleeve arrangement surrounding this ball is the same as in Figures 6 and 7, so that torque rod 41 is mounted for universal movement on fixed spherical balls at both of its ends.

Four of these lower torque rods are provided, two at each side of the vehicle, and the two rods 41 on each side having the central axes of all four balls lying in a common vertical plane. These lower torque rods are preferably all of the same length and size. The brackets 19 are the same on each axle end and the associated torque rod end mounts on brackets 19 identical with that above described on the rearward axle.

Referring to Figures 1–3, the chassis side rails are bridged by a heavy I-beam 46 which helps support brackets 14 and extends parallel to cross tube 13. Between one side of the vehicle and the longitudinal chassis centerline, so as to be laterally spaced from the drive shafts, beam 46 has secured thereto in back to back relation a pair of aligned oppositely projecting brackets 47 and 48 shown in Figures 1 and 2.

Bracket 48 projects toward the rearward axle 12 and comprises integral parallel arms 49 and 51 (Figure 2). As illustrated in Figure 1, each said arm 49 and 51 is bifurcated to provide downwardly open aligned recesses 52 having parallel sides 53 and 54. A spherical ball like that at 29 of Figures 6 and 7 is mounted with its flat sided arms in recesses 52 until secured rigidly to the bracket by bolt assemblies 55' in the same manner that ball 29 is secured to bracket 19.

At the rearward axle, a rigid bracket post 50 is secured upright by studs 70 upon the housing of axle 12, and post 50 comprises integral parallel arms 55 and 56 that are bifurcated to provide aligned flat sided upwardly open recesses 57 and 58 respectively. These recesses receive the flat arms of a ball like that of Figures 6 and 7, and the ball is rigidly secured to the post bracket by through bolt assemblies 59 and 61.

A torque rod 62 extends between the balls on brackets 48 and 50, and a similar torque rod 62 extends forwardly between bracket 47 and a post bracket 50 on the forward axle housing 11. Forward torque rod 62 is mounted on its post bracket 50 like the rear end of rearward torque rod 62 is mounted on its post bracket 50, and the mounting of the torque rod 62 on brackets 47 and 48 are also identical.

Rods 62 lie with their longitudinal axes in a common vertical plane which also passes through the center of the balls at the rod ends, and they are resiliently universally mounted at opposite ends similarly to rods 41.

The torque rod end mounting structure at brackets 19, 47, 48 and 50 is novel and of extreme practical value since it facilitates assembly and disassembly of the rods for repair and service. The ball ends are tightly gripped against rotation, and their parallel sided recesses accurately locate them in the assembly. This provides a sturdy torque rod arrangement for preventing axle housing rotation due to drive or brake torque reactions, and for preventing undue separation of the axles during operation over rough terrain.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A torque rod end mount comprising a bracket having two spaced parts formed with aligned open-sided recesses having flat parallel internal side surfaces, a substantially spherical ball having diametrically oppositely projecting arms non-rotatably mounted within said recesses, said arms having parallel flat side surfaces for being slidably inserted through the open ends of said recesses, means securing said arms rigidly to said bracket, and a torque rod having a resilient universal joint connection to said ball between said parts.

2. A torque rod end mount comprising a bracket having spaced arms bifurcated to provide parallel sided open ended recesses in lateral alignment, a substantially spherical ball having oppositely projecting arms formed with parallel flat surfaces slidably received within said recesses, means securing said ball rigidly to said bracket comprising fastener means connecting the associated arms of said ball and bracket, and a torque rod having a resilient universal end connection with said ball.

3. In the torque rod end mount defined in claim 2, said fastener means comprising a through bolt extending through each bracket arm and the associated ball arm.

4. A unitary ball element for a torque rod end mount comprising a substantially spherical member having two diametrically oppositely extending arms, parallel flat equidistantly spaced surfaces on opposite sides of said arms, and a fastener receiving bore in each arm extending perpendicularly to said surfaces.

5. In a tandem axle suspension adapted to support a chassis upon an axle housing beneath the chassis, an upstanding axle housing bracket provided with spaced arms formed with aligned upwardly open flat-sided recesses, a chassis bracket provided with spaced arms formed with aligned downwardly open flat-sided recesses, a substantially spherical ball between each pair of bracket arms and having diametrically oppositely extending flat-sided arms slidably received and non-rotatably mounted in said recesses, and a rigid torque rod extending between said balls and having at its opposite ends a resilient universal joint connection with the associated ball.

6. In a tandem axle suspension for supporting a chassis upon spaced parallel axle housings beneath the chassis, a spring adapted to be pivoted on said chassis intermediate said axle housings with its opposite ends operatively connected to said housings, and a plurality of torque rods for extending between said chassis and said axles, each of the end connections for the torque rods comprising a bracket, spaced arms on said brackets having parallel flat-sided open-ended recesses, substantially spherical balls having diametrically oppositely extending arms with flat sides slidably received within said recesses, means fastening together the associated ball and bracket arms for rigidly securing said balls to said brackets, and a resilient universal connection between each said ball and the associated torque rod end.

7. In a tandem axle suspension adapted to support a vehicle chassis upon longitudinally spaced transverse axles beneath the chassis, a plurality of longitudinally aligned sets of brackets, one bracket of each set being on the chassis and one of the axles respectively, each of said sets of brackets being formed with open-ended recesses having corresponding flat parallel sides, a plurality of torque rods extending between said brackets, one for each set of brackets, and a readily detachable universal connection between each torque rod end and its associated bracket comprising a ball resiliently mounted on the torque rod end and having oppositely extending flat sided mounting arms snugly slidably received within said recesses, and means locating and fixing each of said arms within the recess on the associated bracket.

8. In the tandem axle assembly defined in claim 7, all of said universal connections being substantially the same and interchangeable.

References Cited in the file of this patent

UNITED STATES PATENTS

| | | |
|---|---|---|
| 283,940 | Wheeler | Aug. 28, 1883 |
| 887,831 | Muth | May 19, 1908 |
| 1,862,027 | Lord | June 7, 1932 |
| 1,943,998 | Adams | Jan. 16, 1934 |
| 2,096,530 | Alden | Oct. 19, 1937 |